United States Patent
Emberling et al.

(10) Patent No.: US 6,833,831 B2
(45) Date of Patent: Dec. 21, 2004

(54) SYNCHRONIZING DATA STREAMS IN A GRAPHICS PROCESSOR

(75) Inventors: Brian D. Emberling, San Mateo, CA (US); Ewa M. Kubalska, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 203 days.

(21) Appl. No.: 10/083,623

(22) Filed: Feb. 26, 2002

(65) Prior Publication Data

US 2003/0160793 A1 Aug. 28, 2003

(51) Int. Cl.[7] .................................................. G06T 1/20
(52) U.S. Cl. ....................... 345/506; 345/520; 345/522; 345/556
(58) Field of Search ................................. 345/501–506, 345/530, 520, 556, 522; 718/102–105; 712/216, 220, 219, 225, 229, 231, 40

(56) References Cited

U.S. PATENT DOCUMENTS 6,329,996 B1 * 12/2001 Bowen et al. .............. 345/506
6,636,214 B1 * 10/2003 Leather et al. ............. 345/422
2002/0085007 A1    7/2002 Nelson

* cited by examiner

Primary Examiner—Matthew C. Bella
Assistant Examiner—Hau Nguyen
(74) Attorney, Agent, or Firm—Meyertons Hood Kivlin Kowert & Goetzel, P.C.; Jeffrey C. Hood

(57) ABSTRACT

A method and system for synchronizing data streams and transferring control of resources between two processes in a graphics processor is described. The method allows for completion of pending operations of a first process in a manner that ensures the first process may be restarted without loss of data or process sequence. The processing pipeline is allowed to complete normal execution of all process operations required to reach a first process step that may be interrupted. The second process is initiated when the interruption of the first process is verified. Upon completion of the second process, the first process is reactivated at the next process step in sequence.

17 Claims, 12 Drawing Sheets

SYNCHRONIZING DATA STREAMS IN A GRAPHICS PROCESSOR

BACKGROUND OF THE INVENTION

1. Field of the Invention

This invention relates generally to the field of computer graphics and, more particularly, to render pipelines.

2. Description of the Related Art

With each new generation of graphics system, there is more image data to process and less time in which to process it. This consistent increase in data and data rates has led system architects to develop an open architecture facilitating the employment of one or more graphics accelerators. In many instances these graphics accelerators are capable of operating semi-autonomously, with only high-level direction from the host computer or microprocessor.

Graphics accelerators capable of performing semi-autonomously act as co-processors, receiving relatively few high-level instructions and parameters from the host, and in turn generating a multitude of displayable pixels or samples. One example of such an operation would be the drawing of a geometric primitive. The host may instruct the graphics accelerator to display a triangle, and may furnish the coordinates of the triangle's vertices. Optionally, the host may also provide color, lighting, transparency and texture information, defining the visual presentation of the triangle. From this small amount of information, the graphics accelerator may independently generate hundreds or thousands of pixels to draw the desired triangle.

Despite the high level of operational autonomy presented by the graphic accelerator, there may still be the need for the host to directly examine or manipulate pixels within the systems graphics buffer. In order to satisfy this need in an effective manner, an alternate data pathway may be provided between the host and the memories of the graphics accelerator. This alternate pathway may share common resources with the normal processing pathways within the graphics accelerator, creating the potential for resource contention.

The potential contention problem is further complicated in a highly pipelined graphics system. In such a system, a stream of pixels or samples may be generated (e.g., as part of geometric primitive rasterization) and placed into a processing pipe, which may represent a multiplicity of process steps or stages, each separated from the next by a clocked register. In a complex system, multiple pipes may exist in parallel, each processing portions of the same data, or performing different functions such as adding lighting effects or surface texturing.

If any portion of the processing pipelines represents common resources shared with the alternate pathway to the host, then direct accesses by the host may determine the disposition of data in process and queued in the pipelines. The disposition of this in process data should be handled carefully to mitigate data loss, and hence the display of erroneous pixels. Furthermore, the contention resolution should be quick and efficient to prevent the unnecessary stalling of the host processor. Therefore, for these reasons, a method for synchronizing data streams in a graphics processor is highly desired.

SUMMARY OF THE INVENTION

The problems set forth above may at least in part be solved in some embodiments by a method for synchronizing data streams in a graphics processor. In one embodiment, the method may include suspending a first process. The suspension of the first process may be executed in a non-destructive manner, allowing any in-process commands or data to continue along a normal course of execution to completion. In some embodiments, the in-process commands and data may be traversing a processing pipeline, wherein this pipeline may split into multiple segments, with pre-determined categories of commands and data routed to each of the various segments. In some embodiments, these multiple segments may rejoin at some downstream point in the processing pipeline. After the first process has been suspended, a special synchronization command (also referred to herein as a sync command or a sync signal) may be issued to the hardware processing block tasked with the execution of the first process. In one embodiment, this synchronization command may be a non-executable command, and may be conveyed through the hardware processing block with no alteration and placed into the processing pipelines. In the pipeline, the synchronization command may follow any pending commands and data through the various hardware processing blocks of the graphics processor. At a predetermined point downstream in the processing pipeline, the arrival of the synchronization command may be detected, and in response, a signal generated indicating that the pipeline has been "drained" of pending commands and data. In response to the indication of the pipeline being drained, a command may be issued to initiate a second process.

In some embodiments, the second process may represent the access of resources within the graphics processor by a host microprocessor or system. These resources may be shared with the first process. In these embodiments, the detection site of the synchronization command may be located on the downstream side of the shared resources, ensuring the draining of the pipeline above.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
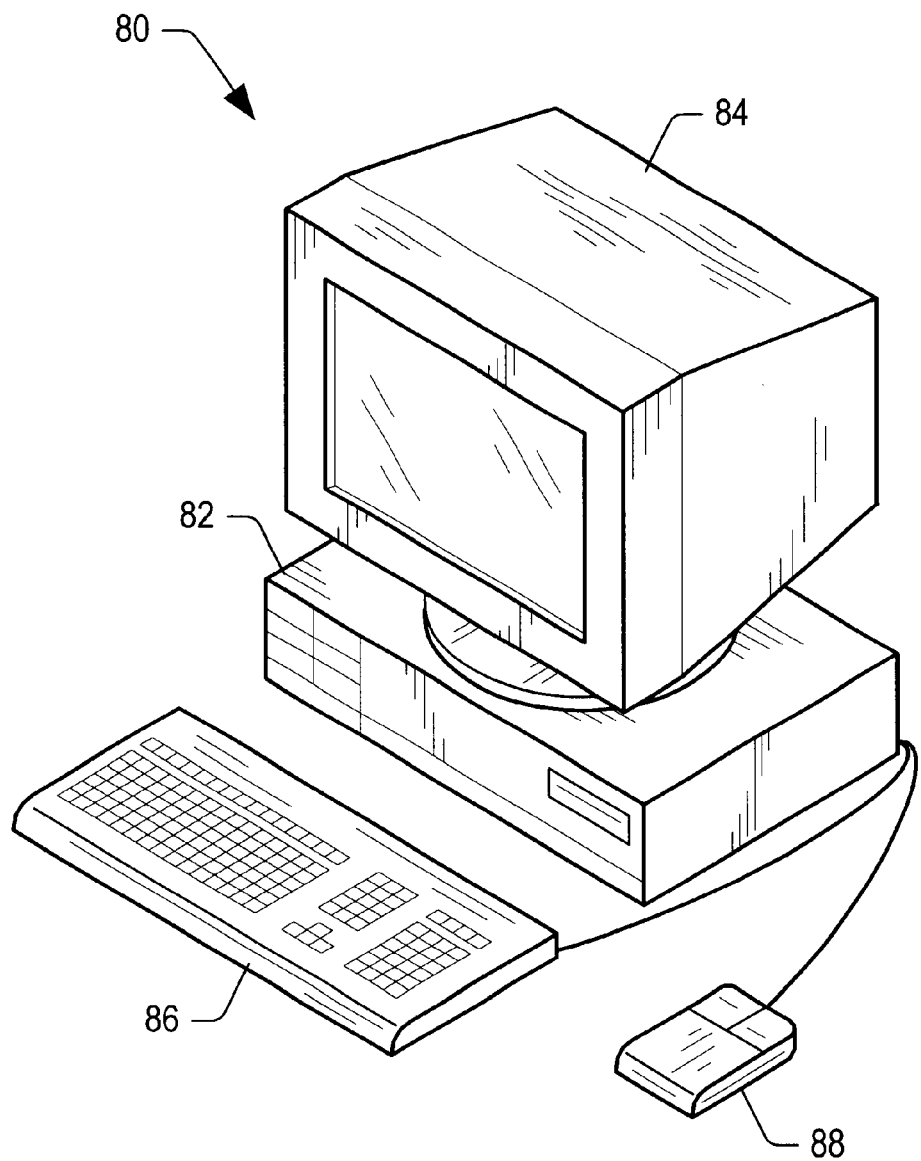
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)". The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices that display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
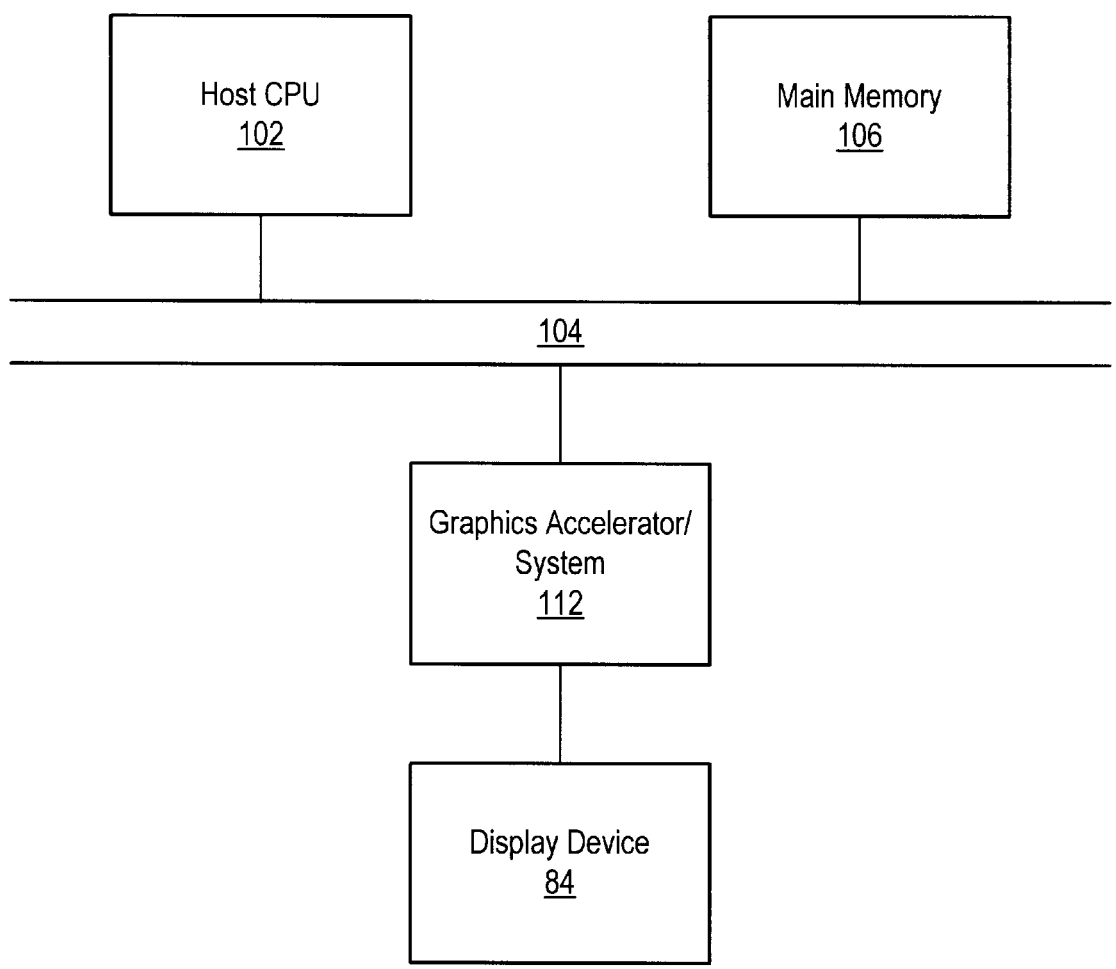
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 maybe connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
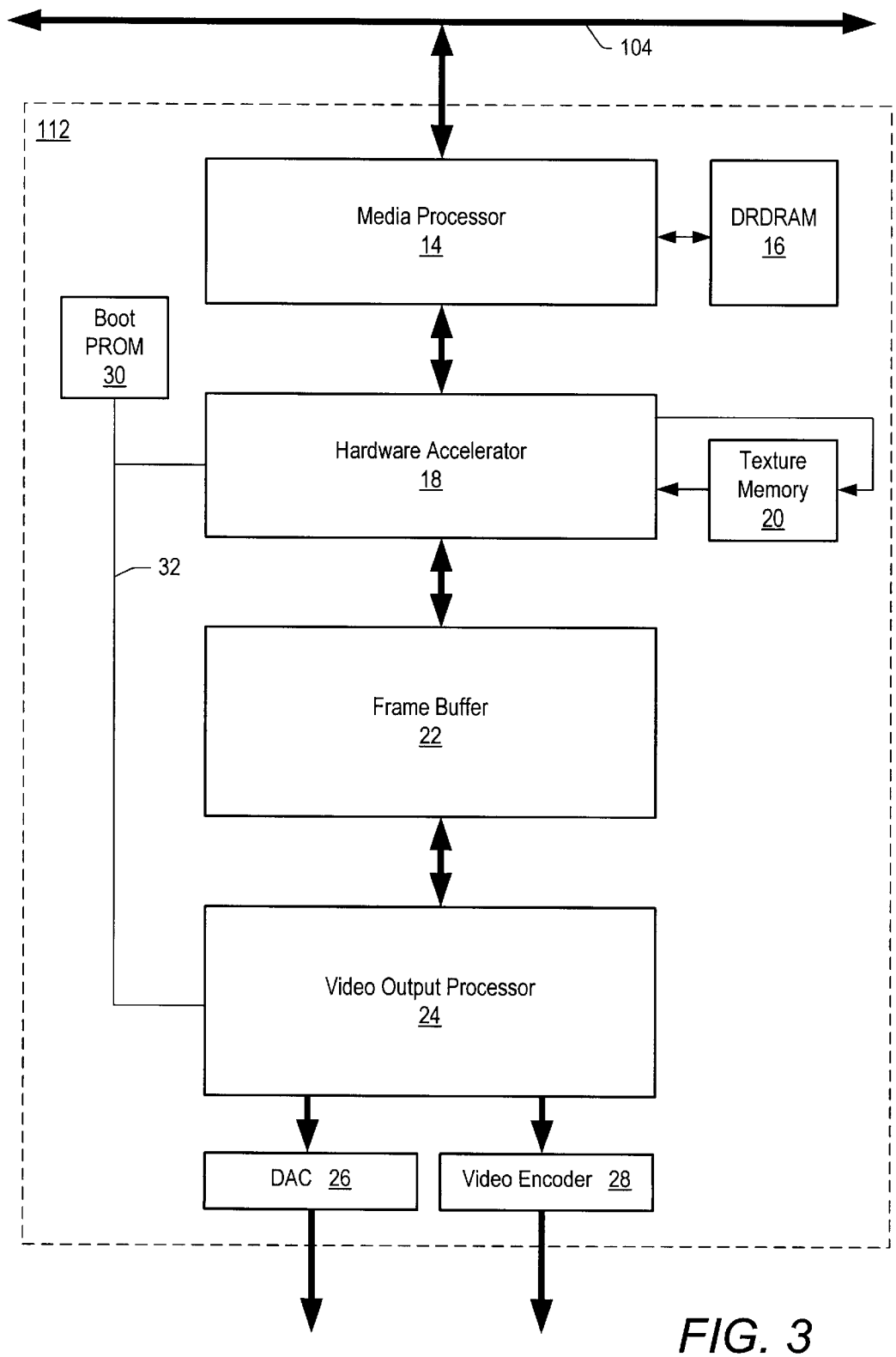
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
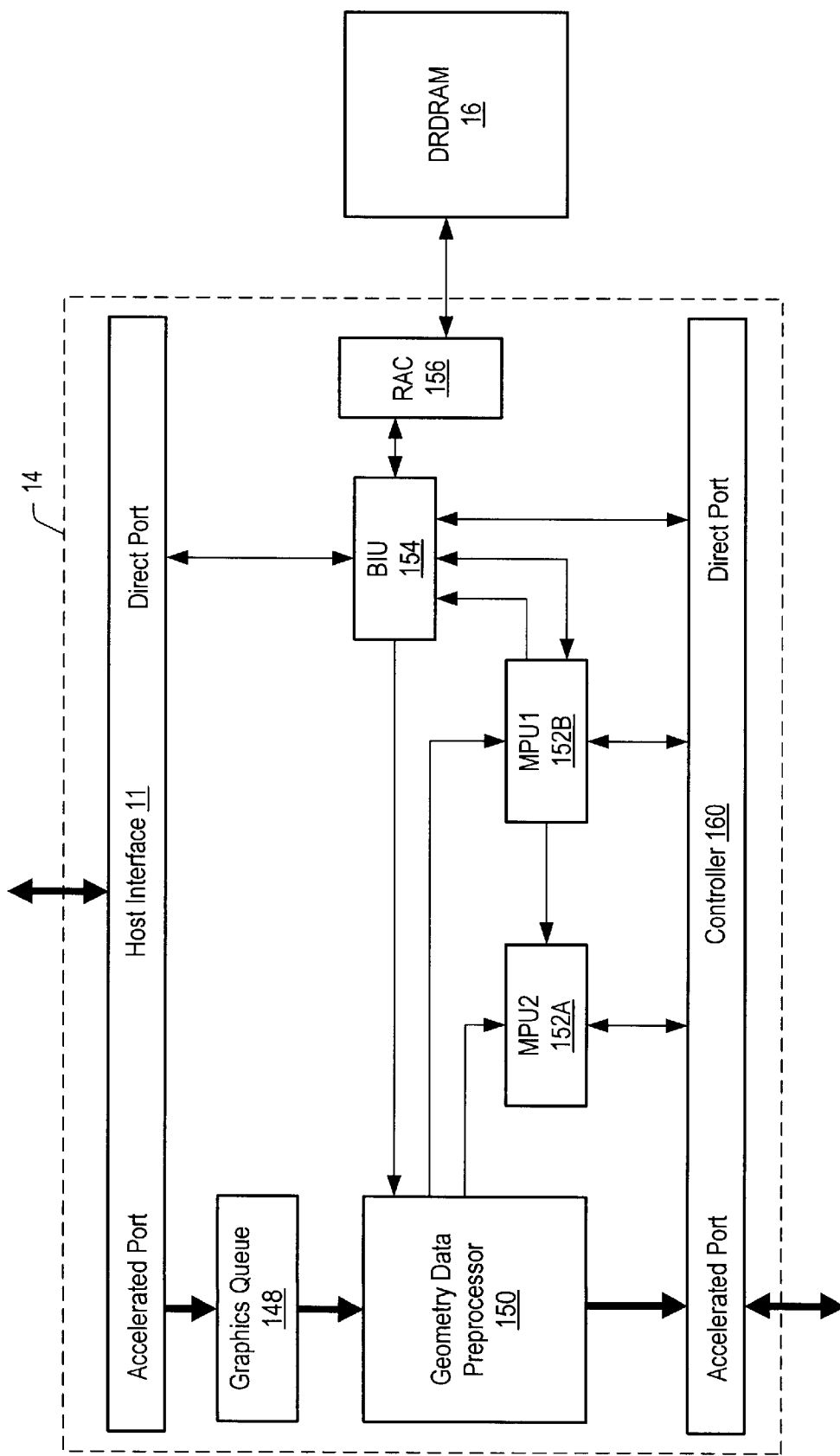
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
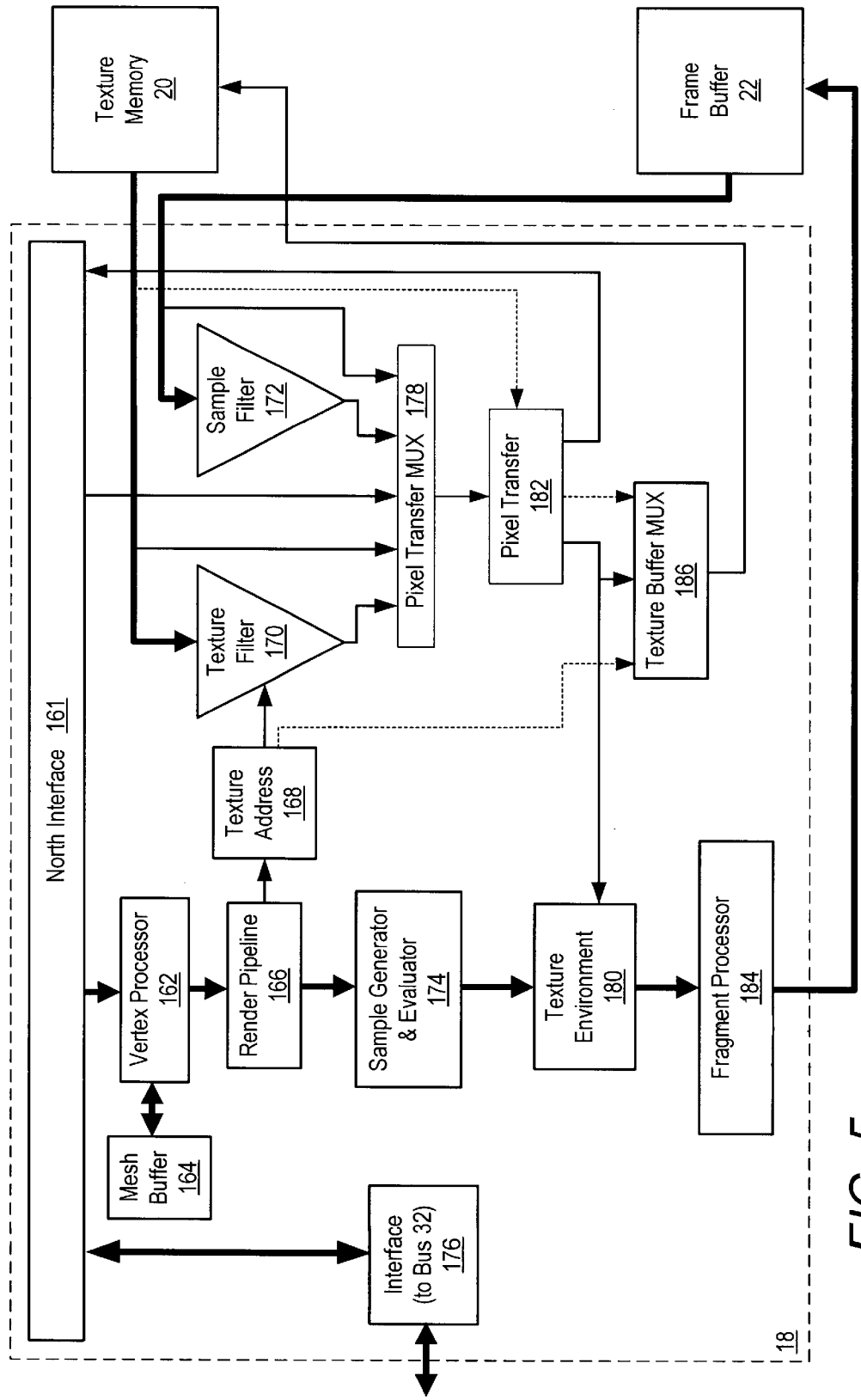
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);
r2, g2, b2 (i.e., red, green, and blue specular color from lit textures);
alpha (i.e. transparency);
z (i.e. depth); and
s, t, r, and w (i.e. texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3D-RAM memory devices (e.g. 3D-RAM64 memory devices) manufactured by Mitsubishi Electric Corporation. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and sample buffer.

Figure 6:
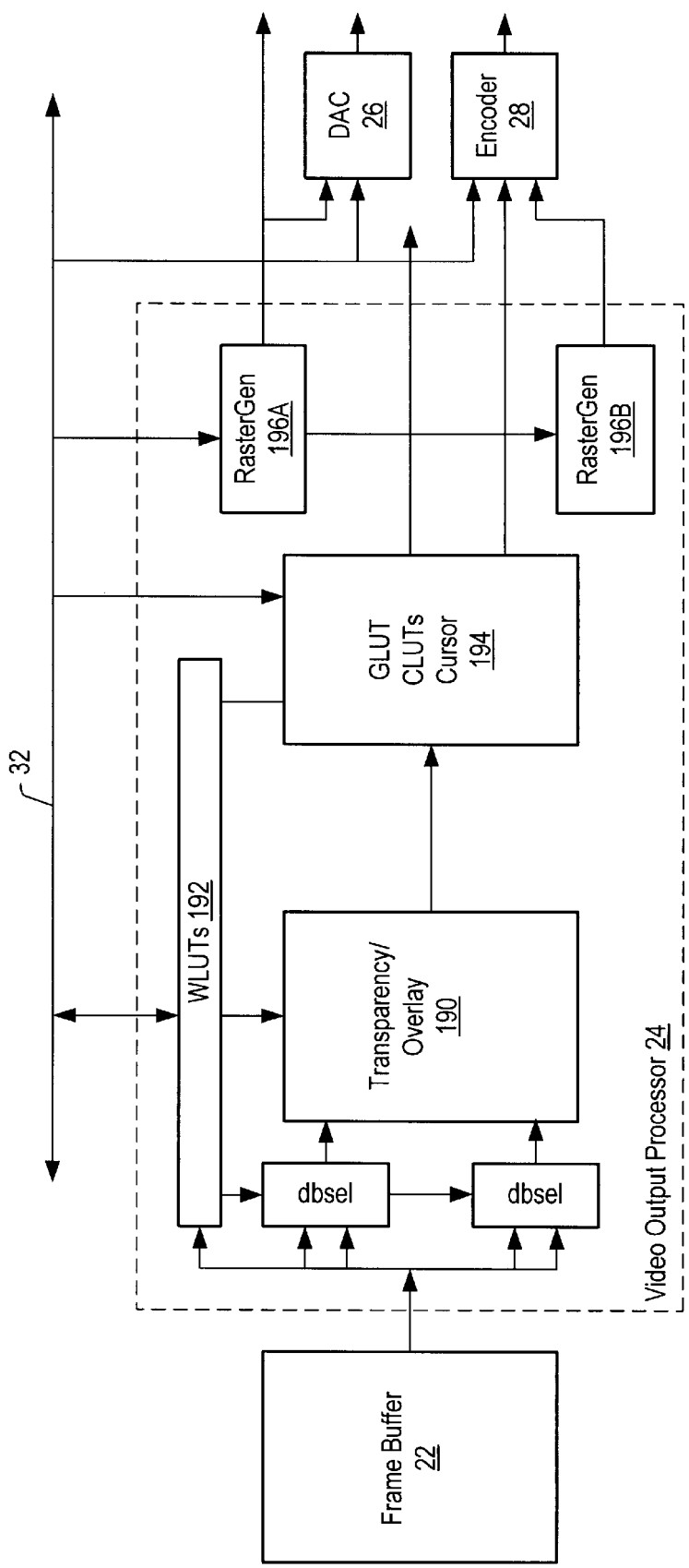
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation.

For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
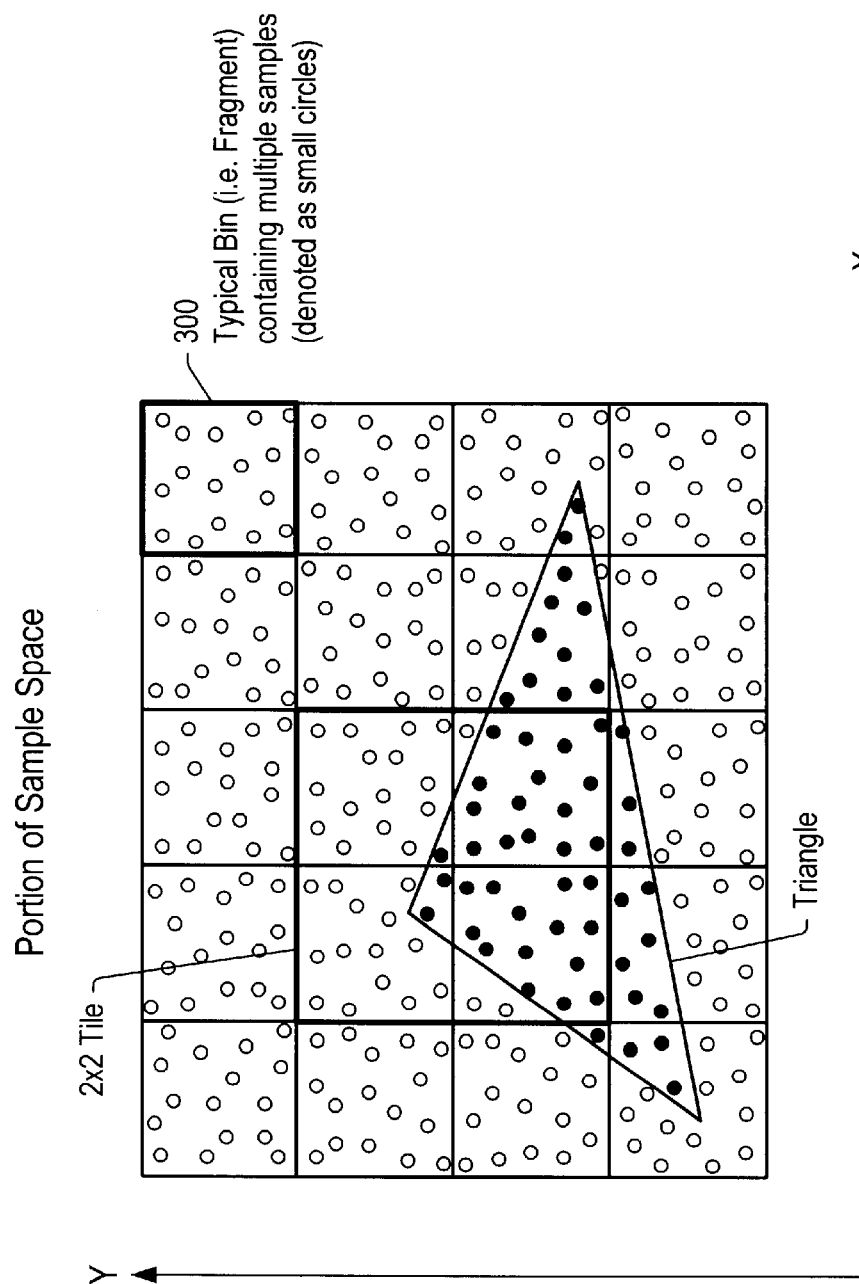
FIG. 7 is an illustration of sample space partitioned into an array of bins.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g. bin 300) as illustrated in FIG. 7. Each bin may contain one or more samples. The number of samples per bin may be a programmable parameter.

Processing Pipelines

Figure 8A:
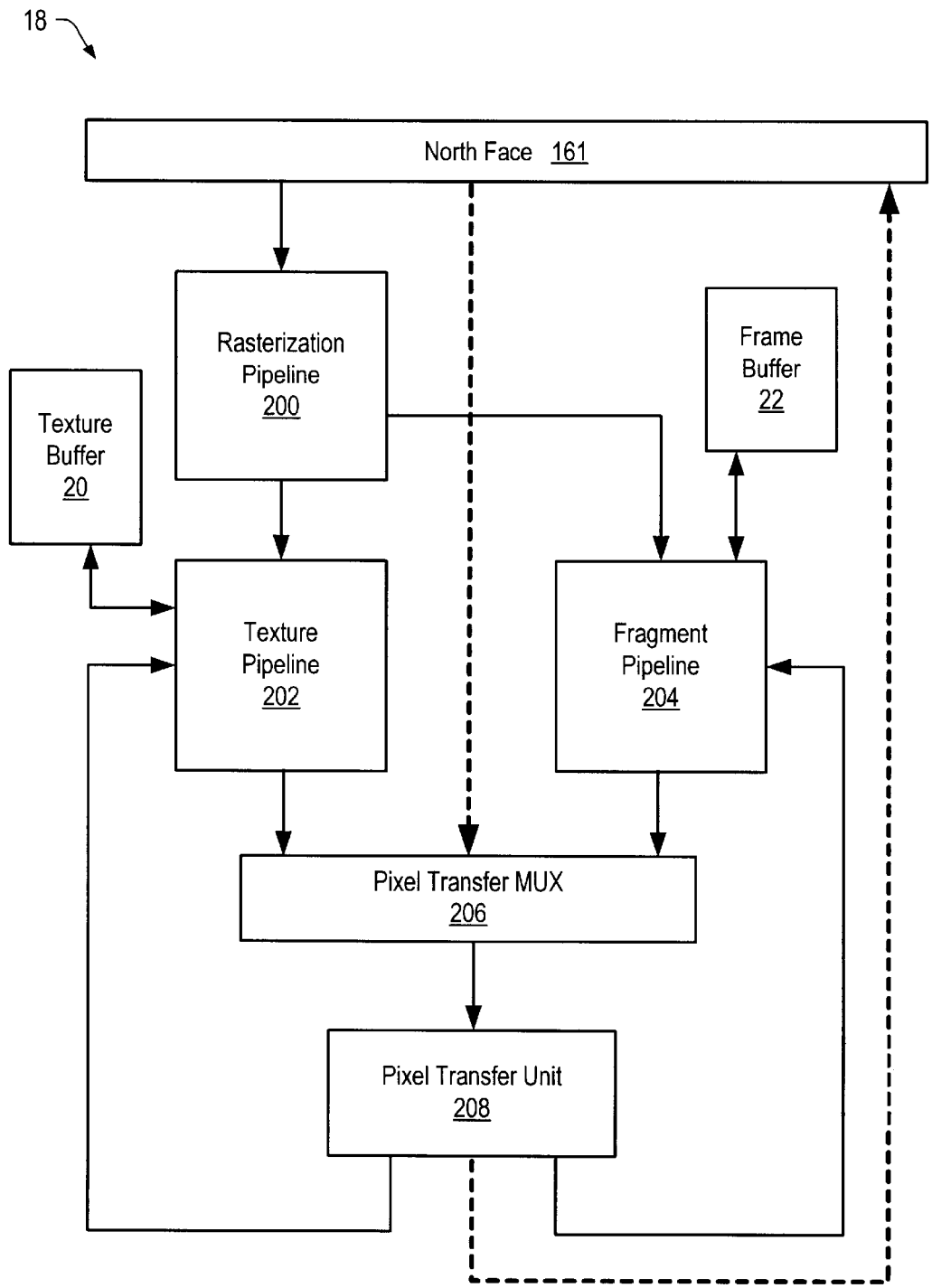
FIG. 8a is a conceptual block diagram of one embodiment of the processing pipelines.

FIG. 8a illustrates a simplified block diagram of one embodiment of the processing pipelines of the hardware accelerator 18. The grouping of the functional blocks of hardware accelerator 18 into the processing pipelines of FIG. 8a is purely for conceptual reasons, and simplifies the following discussion of data paths within the hardware accelerator 18 and potential deadlock situations.

The hardware accelerator 18 may comprise two processing pathways, the accelerated pathway and the direct pathway. The accelerated pathway is confined to the solid arrows of FIG. 8a, and constitutes the main rendering pipeline. The dashed arrows illustrate the direct pathway, whereby the host may be granted access to resources and data within the hardware accelerator 18.

Figure 8B:
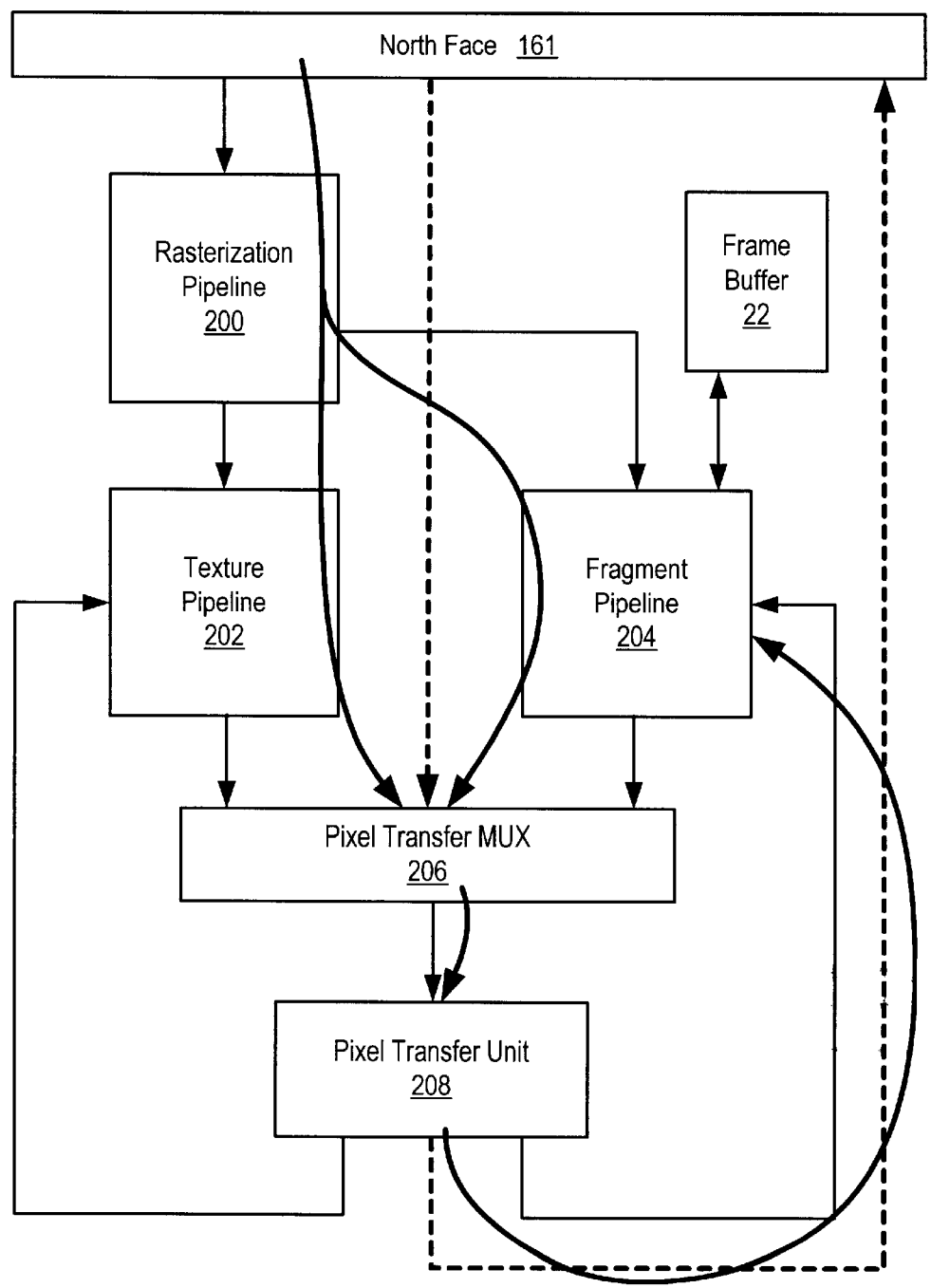
FIG. 8b is a conceptual block diagram of one embodiment of the processing pipelines showing the flow of data when processing textured polygons.

The accelerated pathway is dynamic, and may take various forms depending on the operation being performed. For example, FIG. 8b indicates the flow of data that may result from the processing of a textured polygon received from the north interface 161. In this example, the vertices of the polygon may be received and transformed into a series of horizontal or vertical scans of pixels or samples by the rasterization pipeline 200. These scans may be conveyed to both the fragment pipeline 204 and the texture pipeline 202, where each pixel or sample may be assigned values corresponding to color, lighting, depth cueing, transparency, texture and other rendering parameters. The pixels or samples may then be routed through the pixel transfer MUX 206 and the pixel transfer unit 208 to the fragment pipeline 204 where they may be stored in the frame buffer 22.

Figure 8C:
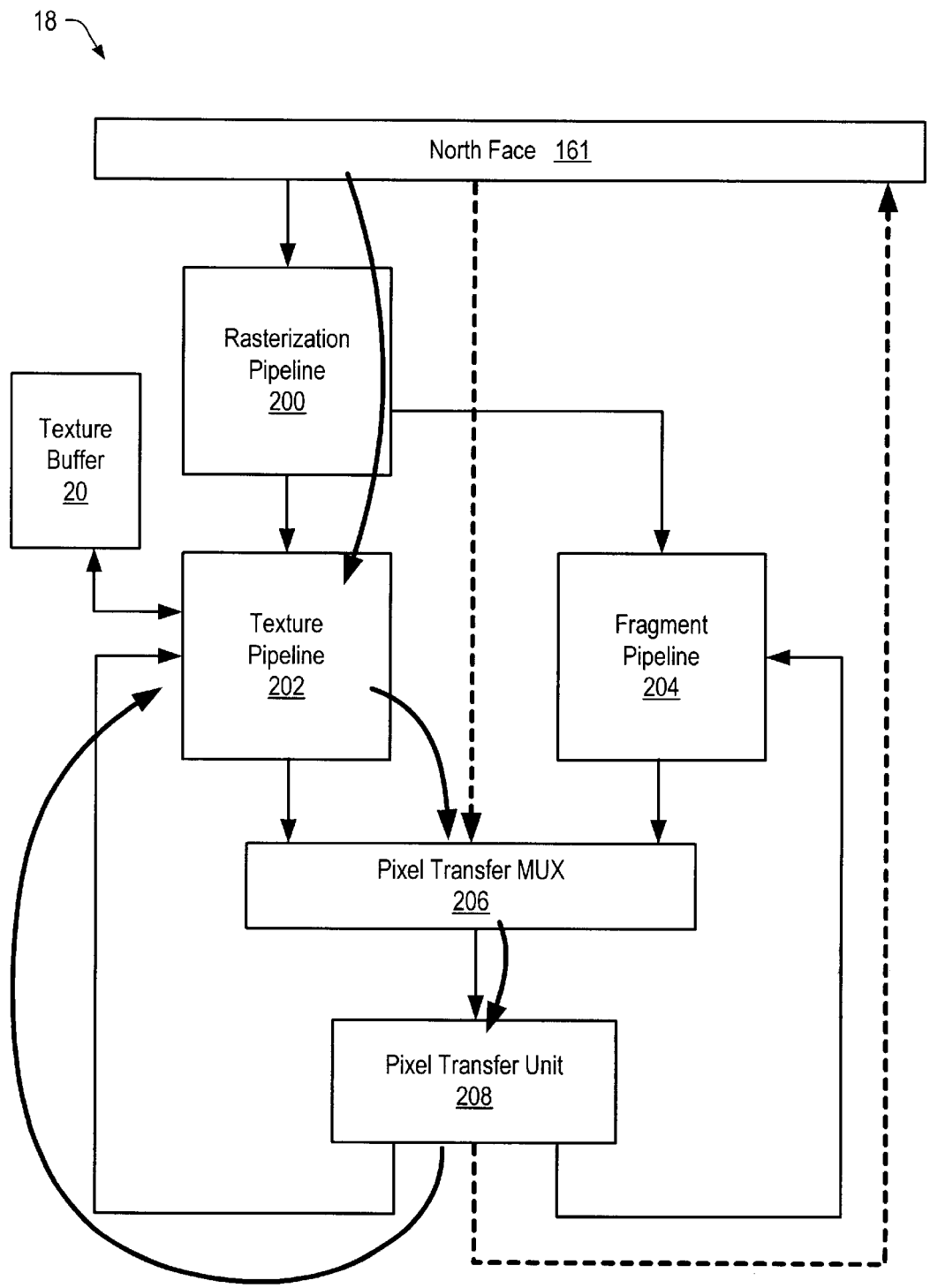
FIG. 8c is a conceptual block diagram of one embodiment of the processing pipelines showing the flow of data while transferring a block of data within the texture buffer.

In FIG. 8c, another potential data path is indicated. In this example, an instruction received on the north interface 161 is passed through the rasterization pipeline 200, and initiates a block transfer of data from one set of locations within the texture buffer 20 to another set of locations. As the data is recalled from the texture buffer 20, it is conveyed to the output of the texture pipeline 202, and selected by the pixel transfer MUX 206. The pixel transfer unit may then route the data back to the texture pipeline where it may be stored in different locations of the texture buffer 20.

Figure 8D:
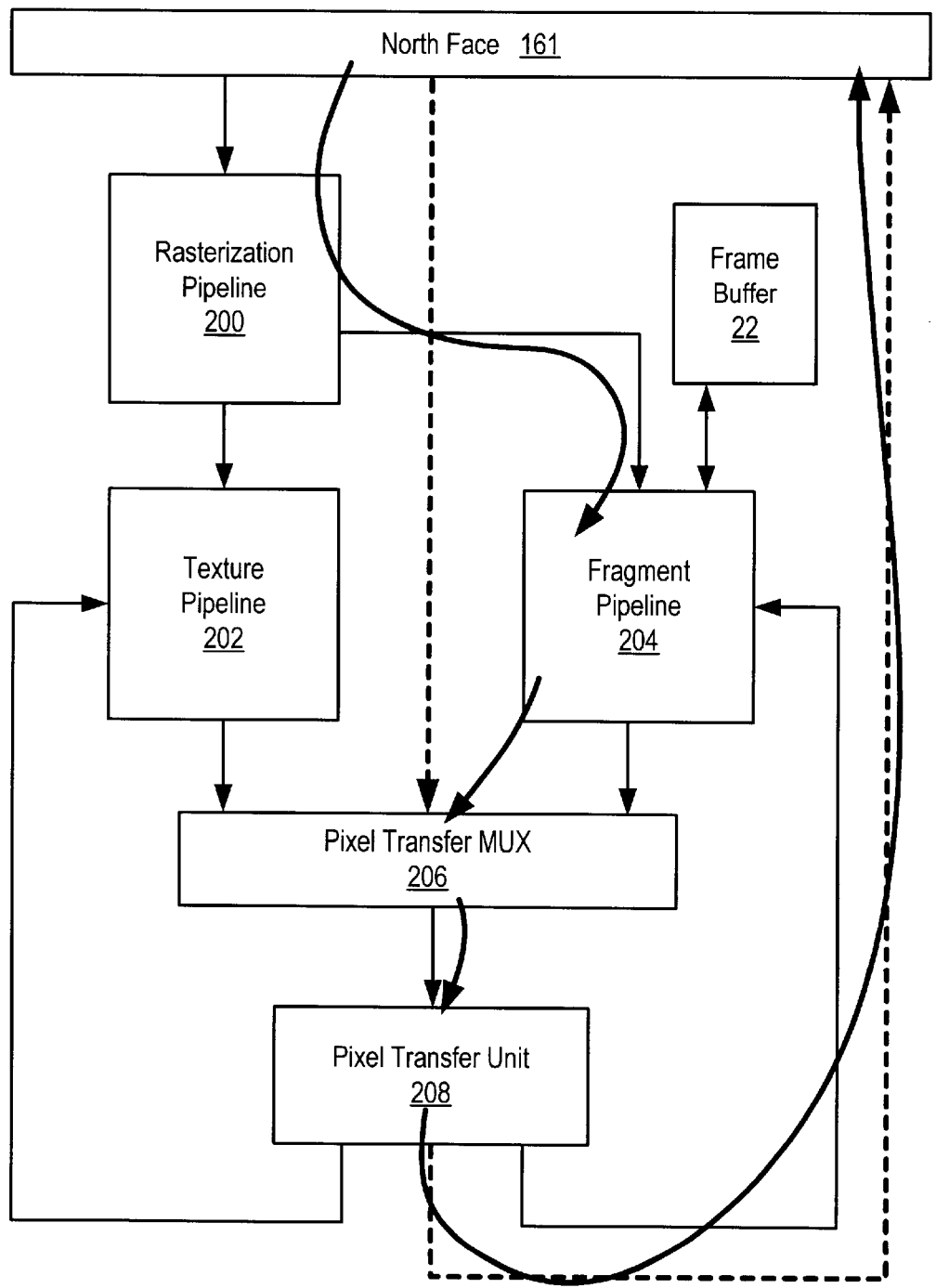
FIG. 8d is a conceptual block diagram of one embodiment of the processing pipelines showing the flow of data while accessing a pixel data from the frame buffer.

In FIG. 8d, one possible flow of data resulting from a direct path access to pixel data residing in the frame buffer 22 is illustrated. An instruction requesting one or more pixels may be received through the north interface 161, and passed through the rasterization pipeline 200 to the fragment pipeline 204. Upon reaching the fragment pipeline 204, the instruction may initiate the transfer of a unit of data, or a block of data from the frame buffer 22. The data may be selected by the pixel transfer MUX 206 and routed by the pixel transfer unit 208 to the north interface 161.

The variability of the data pathways within the hardware accelerator 18 along with the nonsynchronicity existing between the media processor 14 and the hardware accelerator 18 create the potential for resource contention. In one embodiment of the graphics system, the direct pathway may be given priority over the accelerated pathway when arbitrating for resources. In such cases, simply stalling the accelerated pathway while the direct pathway is granted access may not be adequate. It may be necessary to "drain" the pipelines of partially processed data before allowing the direct pathway to have access.

Figure 9:
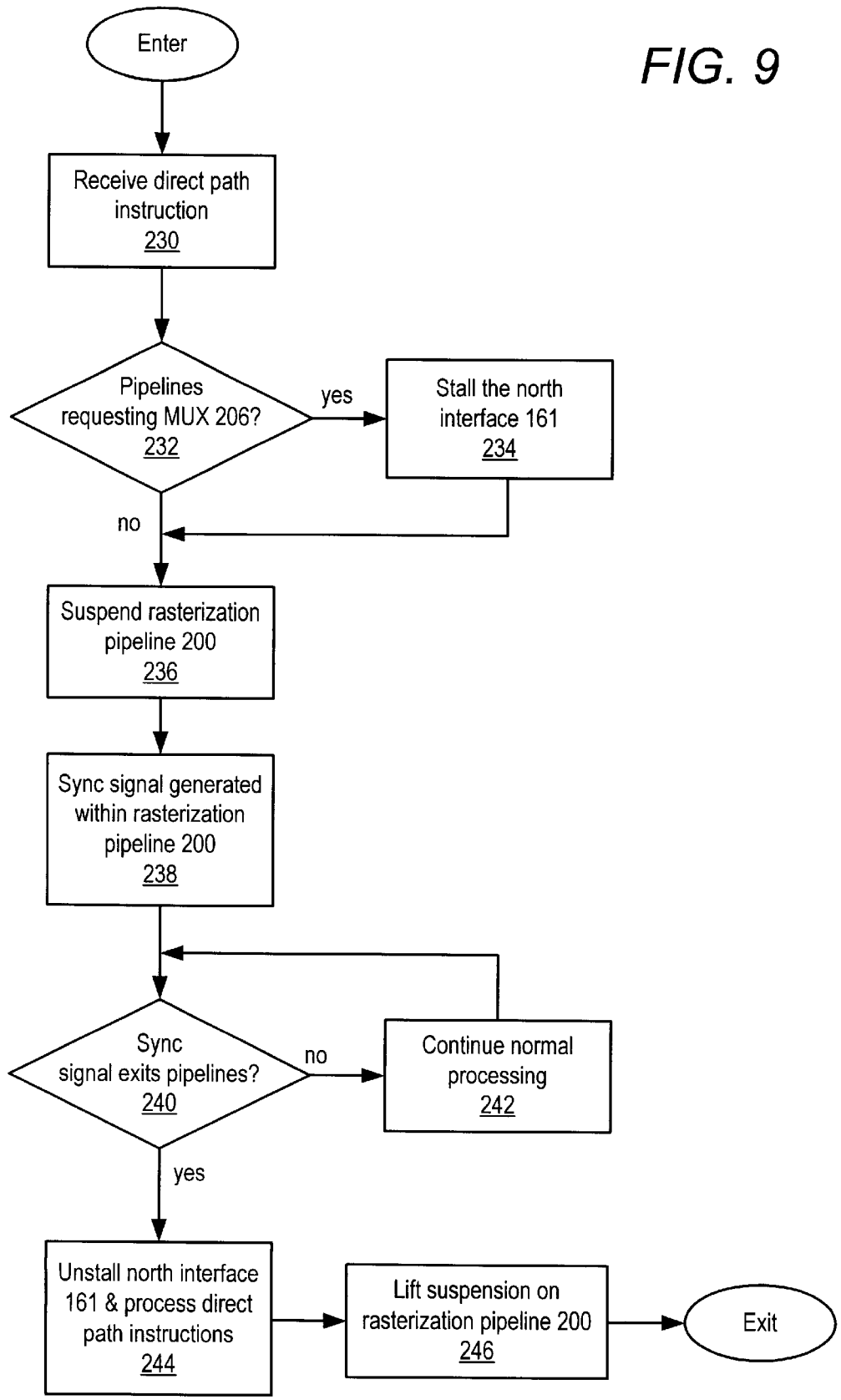
FIG. 9 is a flow diagram that illustrates the method for switching a pipeline or set of pipelines from one process to another.

FIG. 9 is a flow diagram that illustrates one embodiment of a method for draining the pipelines. An instruction, requiring direct path access, may be received through the north interface 161 (step 230). Such an instruction may be a request to transfer data between the media processor 14 and either the frame buffer 22 or the texture buffer 20. The pixel transfer MUX 206 may be tested to determine whether one of the pipelines (i.e., the fragment pipeline 204, or the texture pipeline 202) is currently requesting service (step 232). If the pixel transfer MUX 206 is found to be servicing one of the pipelines, then the north interface 161 may first be stalled while the pipelines are emptying (step 234). A suspend instruction may then be conveyed to the rasterization pipeline 200, which may allow the completion of pending operations (step 236), mitigating any loss of data or operation codes in process. Once the rasterization pipeline 200 enters the suspend mode, a special sync signal may be generated within the rasterization pipeline 200, and sent to both the fragment pipeline 204 and the texture pipeline 202 (step 238). The sync signal may be placed in the same pipe with the in-process data and operation codes, and subsequently follow this pending information on route to the fragment pipeline 204 and the texture pipeline 202. Normal processing of pending operations may proceed until both the fragment pipeline 204 and the texture pipeline 202 indicate that the sync signal has been received, meaning that the processing pipelines have been emptied of all pending operations (steps 240 and 242). The stall imposed on the north interface 161 may be released, and the pending direct path operations processed (step 244). Once these operations have concluded, the suspension of the rasterization pipeline 200 may be released (step 246), and normal (i.e., accelerated pathway processing) may resume.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for transferring control of resources between two processes in a graphics system, the method comprising:
   receiving a request for a process transfer;
   suspending a first process, wherein pending operations associated with the first process are allowed to continue normal execution through a processing pipeline;
   issuing a synchronization command to the first process, wherein the first process sends the synchronization command to follow said pending operations through the processing pipeline;
   initiating a second process in response to detecting the synchronization command at a point in the processing pipeline downstream from said resources; and
   reactivating the first process in response to detecting the termination of the second process.

2. The method of claim 1, wherein the first process comprises the generation of a multiplicity of picture elements, wherein the picture elements are represented by geometric primitives, and wherein the geometric primitives are defined by a list of vertex coordinates and rendering parameters.

3. The method of claim 2, wherein the first process comprises the rasterization and rendering of geometric primitives.

4. The method of claim 1, wherein the synchronization command is not an executable command, and wherein the synchronization command is unaltered by the processing pipeline.

5. The method of claim 1, wherein the second process comprises one or more of reading, storing, and transferring data to resources used by the processing pipeline.

6. The method of claim 1, wherein the processing pipeline comprises a combination of series and parallel pipelines, wherein each of said series and parallel pipelines performs a unique function, and wherein the outputs of the multiple pipelines merge.

7. The method of claim 1, wherein pending operations comprise all initiated operations flowing through the pipeline, and any additional operations required to reach an interruptible step in the first process.

8. A system for transferring control between two processes, the system comprising:
   a processing pipeline;
   an interface, wherein said interface receives a request for a process transfer, wherein, in response to said request, said interface suspends a first process, wherein pending operations associated with the first process are allowed to continue normal execution through said processing pipeline, wherein said interface issues a synchronization command to follow said pending operations of the first process through said processing pipeline; and
   a detection unit, wherein said detection unit is configured to detect said synchronization command issuing from said processing pipeline and to signal said interface upon detecting said synchronization command, wherein said interface initiates a second process in response to said signal.

9. The system of claim 8, wherein said detection unit is configured to detect the termination of the second process and to signal the interface upon detecting said termination, wherein the interface reactivates the first process in response to said signal indicating detection of said termination.

10. The system of claim 8, wherein said processing pipeline comprises a combination of series and parallel pipelines, wherein each of said series and parallel pipelines performs a corresponding function, wherein the outputs of the combination of pipelines merge, and wherein the detection unit is located at a point where the pipelines merge.

11. The system of claim 8, wherein said pending operations comprise a set of initiated operations flowing through the processing pipeline and any additional operations required to reach an interruptible step in the first process.

12. The system of claim 8, further comprising a graphics processor, wherein the graphics processor issues said request for a process transfer.

13. The system of claim 12, wherein said graphics processor is part of a computer system comprising a host computer, one or more graphics systems, one or more display devices, one or more memory devices, and one or more input devices.

14. A system for transferring control between two processes, the system comprising:
   a means for processing graphics process requests, wherein said processing comprises one or more operations on a set of graphics data;
   a means for executing process transfer requests, wherein said means for executing receives a request for a process transfer, and in response to said request, said means for executing evaluates a first process and identifies pending initiated operations associated with the first process and any additional operations selected to reach an interruptible step in the first process, and wherein said means for executing inserts a synchronization command to follow said pending operations and any additional selected operations of the first process through said means for processing, and allows said pending operations and any additional selected operations to continue normal execution through said means for processing; and a means for detecting, wherein said means for detecting is configured to detect the synchronization command issuing from said means for processing and to signal said means for executing after detection of said synchronization command, and wherein said means for executing initiates a second process in response to said signal.

15. A system for transferring control between two processes, the system comprising:

a means for processing graphics process requests, wherein said processing comprises one or more operations on a set of graphics data, and wherein said means for processing is a pipeline;

a means for executing the requests, wherein said means for executing receives a request for a process transfer from a first process to a second process, and in response to said request, said means for executing evaluates the first process and allows initiated pending operations associated with the first process and any additional operations selected to reach an interruptible step in the first process to continue normal execution through said means for processing, before interrupting the first process and initiating the second process; and a means for detecting a termination of a process, wherein said means for executing reactivates the first process in response to said means for detecting detecting the termination of the second process.

16. A method for transferring control of resources between two processes in a graphics system, the method comprising:

receiving a request for a process transfer;

suspending a first process, wherein pending operations associated with the first process are allowed to continue normal execution through a processing pipeline, and wherein said pending operations comprise a set of initiated operations flowing through the processing pipeline and any additional operations required to reach an interruptible step in the first process;

issuing a synchronization command to the first process, wherein the first process inserts the synchronization command to follow after said pending operations through the processing pipeline;

initiating a second process in response to detecting the synchronization command at a point in the processing pipeline downstream from said resources; and reactivating the first process in response to detecting a termination of the second process.

17. A system for transferring control between two processes, the system comprising:

a processing pipeline;

an interface, wherein said interface receives a request for a process transfer, wherein, in response to said request, said interface suspends a first process, wherein pending operations associated with a first process are allowed to continue normal execution through said processing pipeline, wherein said pending operations comprise a set of initiated operations flowing through the processing pipeline and any additional operations required to reach an interruptible step in the first process, and wherein said interface issues a synchronization command to follow said pending operations of the first process through said processing pipeline; and a detection unit, wherein said detection unit is configured to detect the synchronization command issuing from said processing pipeline and to signal said interface upon detecting said synchronization command, wherein said interface initiates a second process in response to said signal indicating detection of the synchronization command.

* * * * *